G. W. Putnam,
Meat Tenderer,

Nº 45,633. Patented Dec. 27, 1864.

Witnesses:
James P Hall
Harry Morris

Inventor:
G W Putnam
per Munn & Co
Attorneys

UNITED STATES PATENT OFFICE.

GEORGE W. PUTNAM, OF PETERBOROUGH, (TOWN OF SMITHFIELD,) N. Y.

IMPROVED MEAT-MASHER.

Specification forming part of Letters Patent No. 45,633, dated December 27, 1864.

*To all whom it may concern:*

Be it known that I, GEORGE W. PUTNAM, of Peterborough, in the county of Madison and State of New York, have invented a new and useful Improvement in Mode of Preparing Meats; and I do hereby declare that the following is a full, clear, and exact description thereof, which will enable those skilled in the art to make and use the same, reference being had to the accompanying drawings, forming part of this specification, in which—

Figure 3:
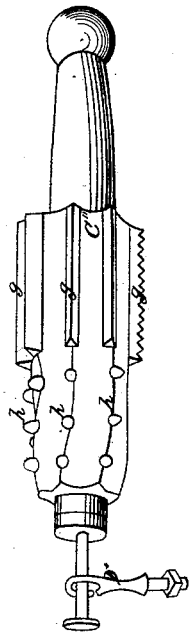
Figure 4:
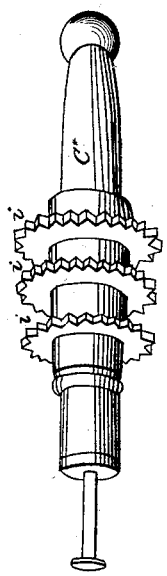
Figure 1:
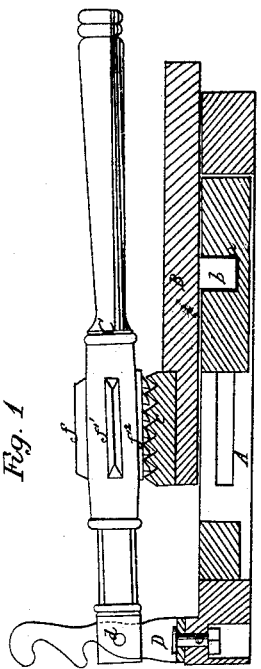
Figure 2:
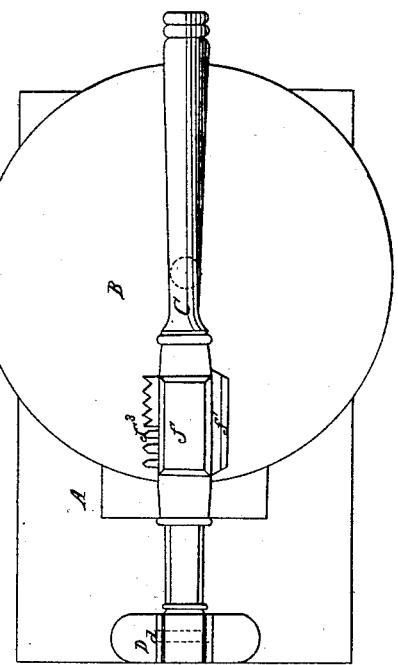

Figure 1 represents a longitudinal vertical section of my invention when arranged with the reciprocating bruising-lever. Fig. 2 is a plan or top view of the same. Fig. 3 is a detached perspective view of a revolving pounder, which may be substituted for the reciprocating bruising-lever. Fig. 4 is a modification of the same.

Similar letters of reference indicate corresponding parts.

This invention consists in a reciprocating bruising-lever connected to a vertically-adjustable swivel-standard, and provided with a toothed or rough surface plate, of iron or other suitable material, to operate in combination with a suitable block of wood or other material provided with or without a rough surface in such a manner that a piece of meat placed on said block of wood can be thoroughly pounded by the action of the lever and its fibers broken or bruised to render the same tender previous to cooking.

A represents a frame, made of wood or any other suitable material or combination of materials, and provided with a socket, $a$, to receive the central stud, $b$, of the table or block B. This table may be made of wood or other suitable material, and it is, or may be, provided with a rough surface, $c$, which is to receive the meat to be prepared.

After the meat has been placed on the table B or on the rough surface $c$, it is exposed to the action of the bruising-lever C. This lever has its fulcrum on a pivot, $d$, and is secured in a standard, D, rising from the frame A, and this standard is so arranged that it easily rotates on a pivot, $e$, and that it can be raised and lowered, if desired. By these means the lever C can be moved laterally, so as to sweep over a considerable portion of the table B, or over the entire rough surface $c$, attached to said table; or, if desired, the standard can be reversed and another surface of the lever can be brought into action.

The various surfaces of the lever C are provided with pounding-plates $f f' f^2 f^3$ of a different nature. One of the pounding-plates presents a smooth surface, another a knife-shaped projection, one a series of bill-shaped teeth, and one a combination of points and flat pointed teeth, to be used either alone or in succession, according to the nature of the meat to be prepared.

The various pounding surfaces of the lever C may be made of wood or iron coated with zinc, tin, or other non corrosive metal, or of any other suitable material, and by placing the meat to be prepared on the table or surface $c$ and repeatedly working the lever with sufficient force the fiber of the meat is broken or bruised and the meat is made tender.

Instead of the reciprocating lever C a lever, C*, may be used, which is made wholly or partially round, as shown in Figs. 3 and 4, and this lever is fastened to a hooked standard, D*, so that a rolling motion may be given to it, if desirable, and after the fibers of the meat are sufficiently bruised or broken by the above process it (the lever) may be used as a beater, and a few light blows, if desirable, may be given with the lever to equalize the surface of the meat.

The lever C* may be readily detached to facilitate the beating operation, and also the operation of cleaning the machine.

The surface of the lever C* may be provided with longitudinal smooth-edged or scalloped ridges $g$, or with spikes $h$; or it may be furnished with star-shaped collars $i$, as shown in the drawings.

The superiority of this mode of preparing meat over the common method of pounding is that the fiber or grain of the meat is not mashed or made pasty and unpleasant to the sight, but the fiber, though well broken, preserves a perfect texture and good appearance, and is much more palatable, the ridged or toothed surfaces of the levers always producing the desired result. The juices of the meat are saved also by passing into the indentations made by the ridged surfaces. Thus my machine is highly useful, because with very much less noise and labor than by the usual mode of pounding the meat, as above stated, is put in a much better condition for cooking by treating as above described. It is rendered wholesome, palatable, and easy of digestion.

I claim as new and desire to secure by Letters Patent—

The use of a reciprocating or rolling lever, C C*, with flat or rough beating-surfaces, to operate in combination with the table B, or its equivalent, substantially in the manner and for the purpose herein shown and described.

GEORGE W. PUTNAM.

Witnesses:
 REUBEN GORDON,
 THOMAS C. BARNETT.